United States Patent [19]

Havran

[11] Patent Number: 5,146,871
[45] Date of Patent: Sep. 15, 1992

[54] INCUBATOR AND HATCHER TRAY

[75] Inventor: Thomas P. Havran, Seville, Ohio

[73] Assignee: Chick Master Incubator Company, Medina, Ohio

[21] Appl. No.: 764,838

[22] Filed: Sep. 24, 1991

[51] Int. Cl.$^5$ .................. A01K 43/00; A01K 41/06
[52] U.S. Cl. .................................. 119/43; 119/44
[58] Field of Search ........................ 119/44, 43, 35

[56] References Cited

U.S. PATENT DOCUMENTS

| | | |
|---|---|---|
| 1,532,021 | 3/1925 | Baker . |
| 2,255,036 | 9/1941 | Gedge . |
| 2,266,648 | 12/1941 | Mack . |
| 3,147,738 | 9/1964 | Theilig . |
| 3,470,851 | 10/1969 | Cannon . |
| 3,958,711 | 5/1976 | Morris et al. . |
| 4,398,499 | 8/1983 | Blakely . |
| 5,046,454 | 9/1991 | Jensen ................ 119/43 |

FOREIGN PATENT DOCUMENTS

| | | |
|---|---|---|
| 1024238 | 1/1978 | Canada . |
| 2005929 | 6/1990 | Canada . |
| 591052 | 4/1959 | Italy ................ 119/43 |

OTHER PUBLICATIONS

Chick Master Incubator Company Brochure.

Primary Examiner—John G. Weiss
Attorney, Agent, or Firm—Watts, Hoffmann, Fisher & Heinke Co.

[57] ABSTRACT

A single piece, nestable combination setter/hatcher tray for poultry eggs wherein an upper egg support portion is integrally molded to one side of a base. The upper egg support portion defines a plurality of egg receptacles, each for supporting individual eggs ina substantially vertical orientation. The upper egg support portion also includes apertures to promote air flow around the supported eggs. A hatch portion is integrally molded to the base, opposite the upper egg support portion to define a hatch section which is sized to promote a spaced nesting relationship with the upper egg support portion of another tray such that a maximum number of eggs can be incubated ina minumum amount of incubator space. Once incubated, the eggs are transferred to the hatch section of the next adjacent tray with minimal effort and injury by inverting the nested trays. The eggs, once inverted, continue to be positioned in an essentially verical orientation. After inversion, the trays are unnested to allow each egg to roll into a fully supported horizontal orientation within the hatch section. The trays may then be individually placed in a hatch chamber for hatching. Alternatively, the trays may be interconnected with lost motion clips and suspended in a hatch chamber thereby eliminating the need for hatch chamber shelving.

13 Claims, 5 Drawing Sheets

INCUBATOR AND HATCHER TRAY

FIELD OF INVENTION

This invention relates to an improved combination setter/hatcher tray for incubating and hatching poultry eggs. More specifically, this invention relates to a nestable combination setter/hatcher tray wherein a stack of nested setter/hatcher trays can be inverted to transfer poultry eggs from the setter portion of a tray to the hatcher portion of another tray with minimal damage, thereby maximizing incubator space utilization while minimizing the work required for egg transfer.

BACKGROUND ART

Poultry operations incubate fertilized eggs in incubators to increase the production of poultry for breeding and food supplies. Generally, the eggs are placed in a setter tray in a substantially vertical orientation. The setter trays are then placed in an incubator throughout an 18 day portion of an incubation period. The trays are periodically tilted and rocked throughout the incubation period to prevent the developing embryos from adhering to the interior egg shell surfaces. The environment—temperature, humidity, etc. within the incubator is regulated to promote uniform embryo development by attempting to simulate or even improve upon natural incubation conditions. Upon the completion of the 18 day portion, the setter trays are removed from the incubator. The eggs are then transferred to hatcher trays designed to facilitate and support chick hatches.

Hatcher trays typically support an egg in a horizontal orientation throughout a hatching portion of the incubation period. Unlike the setter tray receptacles which restrict egg movement, hatcher trays attempt to provide sufficient room for the eggs during the hatch to minimize injury to the chicks. Once the eggs are transferred from the setter trays, the hatcher trays are placed in a temperature controlled hatcher. Over the next two to three day period, the chicks hatch from the eggs and occupy a substantial portion of the provided room. The hatcher trays and chicks are then removed for further processing.

Alternative tray designs have been proposed to promote the efficient use of incubator space. One such proposed setter tray supports eggs in a vertical array having a tower-like structure rather than in a horizontal array of a typical pan-like tray. Other trays purport to simplify the transfer of eggs from the setter to the hatcher trays. One such proposed design utilizes a setter tray sized to fit within a corresponding hatcher tray. Once the trays are properly fitted, the bottom of the setter tray slides open to deposit the incubated eggs onto the bottom of the hatcher tray in a horizontal orientation. Thereafter, the setter tray is removed and the hatcher tray is then placed into a hatch chamber for the requisite period.

Another proposed design includes a compartmentalized tray which attempts to minimize the handling of eggs between incubation and hatching periods. The tray includes both a body member and a cover. The body member includes slotted sidewalls integrally formed with the lower surface of a top wall. The sidewalls extend downwardly when in incubation orientation, and upwardly when in hatch orientation.

The lower surface of the top wall includes a large number of egg shaped oval compartments as well as perforations within the compartments to promote the free circulation of air. The dimensions of the compartments are intended to be sufficient to allow a hatching chick to extricate itself from its shell when hatching.

Four short upright fingers having rounded upper ends are integrally formed on the upper surface of the top wall. A group of fingers is centered over each compartment to support the smaller egg ends in coaction with the cover, when the body and cover are assembled in a stacked relationship.

The cover includes a horizontal wall and a skirt. The skirt acts to space the cover from the upper surface of the body member, when in a stacked relationship, at a distance at least greater than the length (major dimension) of the eggs intend to be handled. The horizontal wall defines a series of circular openings of a diameter slightly greater than the diameter (minor dimension) of an egg to be handled so that each egg will be supported around its "waist". Additionally, each opening is centered over the four fingers carried by the top wall of the next lower tray body and also below the corresponding compartment of its own tray body, when in a stacked relationship.

In use, a tray body is first placed onto a support, in its incubation orientation, to act as a base. A cover portion is placed atop the body. A plurality of eggs are then placed, with their major axis vertical, into each of the circular openings so that the smaller egg end is supported by the four fingers carried by the top wall of the next lower body. This process is repeated until a stack of fully loaded tray bodies and covers is created. Thereafter, the stack of trays is placed into an incubator for an eighteen or nineteen day incubation period. The stack is rhythmically tilted within the incubator to prevent the adhesion of the embryos to the interior egg shell surfaces throughout this period.

After eighteen or nineteen days, a computer actuated tray tilting mechanism arrests the rhythmic tilting motion of the stack by placing the stack in a horizontal position. Thereafter, the stack is completely inverted to drop each egg from its circular opening into the corresponding compartment in the top wall of the next lower body member. During the inversion process, complete emergence of each egg from its circular opening is said to be guaranteed by the fact that the cover and body member walls are spaced apart by a distance greater than the length of an egg.

Once the inversion of a stack is complete, each egg is supported in the compartments in a horizontal orientation throughout the two or three day hatching period. Once hatching is complete, the chicks are contained within the compartments until the trays—still stacked and inverted, are removed from the incubator and disassembled.

SUMMARY OF THE INVENTION

The present invention provides a single piece, nestable combination setter/hatcher tray for poultry eggs which maximizes the efficient use of space within an incubator or incubator buggy while minimizing the work required to transfer incubated eggs from setter trays to a hatcher trays. The nesting relationship of the trays also minimizes potential damage to the incubated eggs while they are transferred to hatcher trays for chick hatching. Additionally, the method and apparatus of the present invention increases the productivity, profitability, and efficiency of the incubation process by minimizing the need for shelves which support the egg trays in most incubation systems.

An upper egg support portion is integrally molded to one side of a base. The upper egg support portion defines a plurality of egg receptacles, each for supporting an individual egg in a substantially vertical orientation. The upper egg support portion also includes apertures to promote air flow around the supported eggs.

A hatch portion is integrally molded to the base, opposite the upper egg support portion. The hatch portion side and ends walls, in conjunction with the base, define a hatch section which is sized to promote a spaced nesting relationship with the upper egg support portion of another tray. The spaced nesting relationship is such that a maximum number of eggs can be incubated in a minimum amount of incubator space. Moreover, once the incubation period is complete, between 13 and 19 days, the spaced nesting relationship allows the incubated eggs to be transferred to the hatch section of the next adjacent tray with minimal effort or injury by inverting the nested trays while maintaining the eggs, once inverted, in essentially vertical orientation. After inversion, the trays are unnested which allows each egg to roll into a fully supported horizontal orientation within the hatch section. The hatch section, once a tray is inverted and un-nested, provides sufficient space for the unobstructed rolling movement of the eggs during the hatch period and for the chicks once hatched to minimize injuries during and after the hatch.

The trays are then placed in a hatch chamber in an un-nested relationship until substantially all the eggs hatch. With one embodiment, the trays are un-nested and individually placed in the hatch chamber. With an alternative embodiment, the trays are interconnected and suspended in a hatch chamber thereby eliminating the need for hatch chamber shelving. With the alternate embodiment, lost motion hooks interconnect the trays. The top tray is lifted to unnest it from the stack. Once the lost motion hooks lift the second tray, it is unnested from the third tray and so on until the entire stack is unnested.

Accordingly, the objects of the invention are to provide a novel and improved setter/hatcher tray and a method of hatching eggs which increases the efficiency, productivity, and profitability of incubation systems. Other objects and a further understanding may be had by referring to the following description and claims taken in conjunction with the accompanying drawings.

BRIEF DESCRIPTION OF THE DRAWINGS

FIG. 8 is a side elevational view of the trays of FIG. 7 in an

Figure 1:
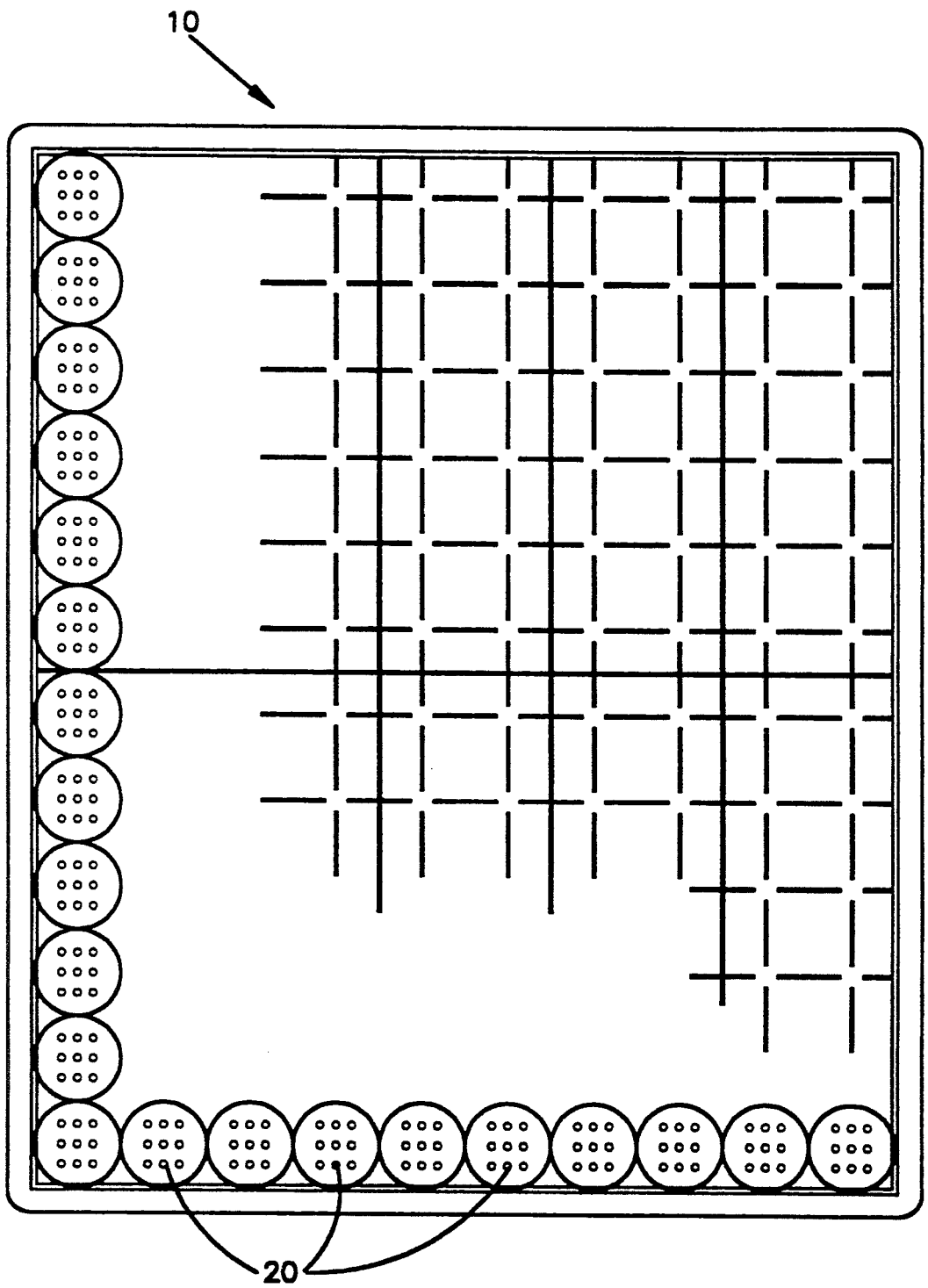
FIG. 1 is a plan view of the upper egg support portion of the setter/hatcher tray of the invention.

BEST MODE FOR PRACTICING THE INVENTION unnested suspended state.

Referring now to the drawings, the setter/hatcher tray 10 of the present invention is disclosed. The tray will typically be manufactured of polypropylene through standard injection molding processes. Polypropylene is ideal since it is resistant to chemical attacks which result from sterilization or other processes to which the trays 10 are exposed.

An upper egg support portion 12 includes apertured sidewalls 13 integrally molded with a base 16 and a plurality of egg support receptacles 14. The support receptacles 14 include support structure such as gripping teeth-like projections 15 to support each egg in a 235 vertical orientation such that the air cell or wider end of the egg is up.

The base 16 and the receptacles 14 define apertures 20 to promote air flow around the eggs and between the upper egg support portion 12 tray and the hatch portion 22. The apertures 20 are sized such that a flat surface of the base 16 which is opposite the receptacles 14 provides a perchable surface within the hatch portion 22 for newborn chicks. The hatch portion 22 is integrally molded with the base 16 opposite the egg support portion 12 and includes apertured sidewalls 24 which define the perimeter of a hatch section 26.

Figure 2:
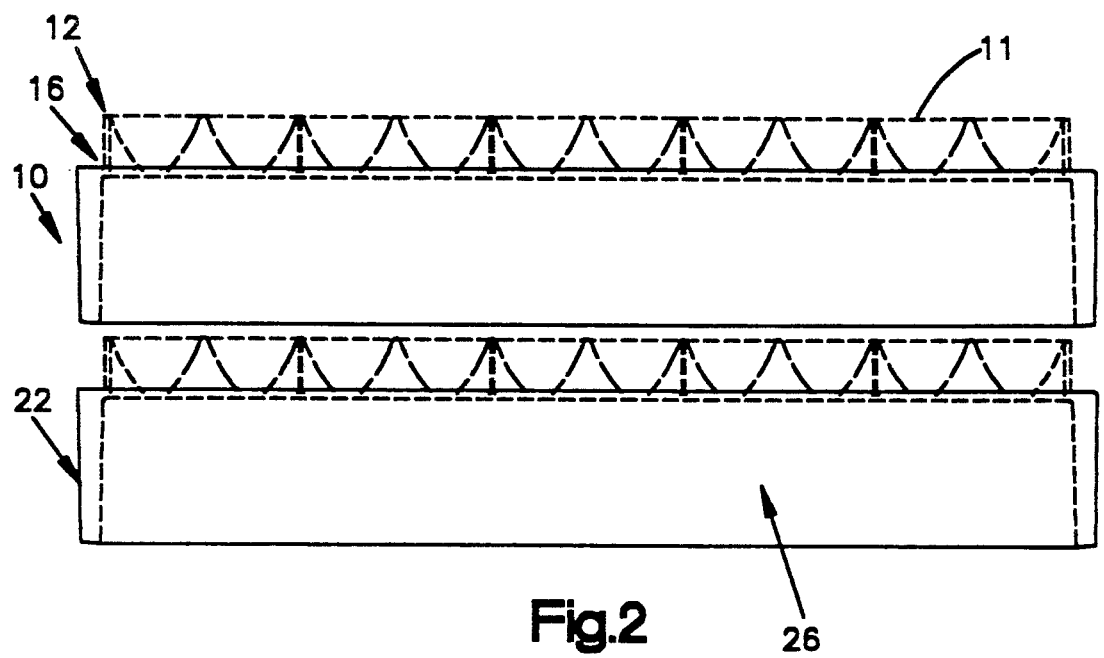
FIG. 2 is a cross sectional view of a setter/hatcher tray illustrating the nesting relationship between the upper egg support portion of one setter/hatcher tray and the hatch portion of another setter/hatcher tray.
Figure 3:
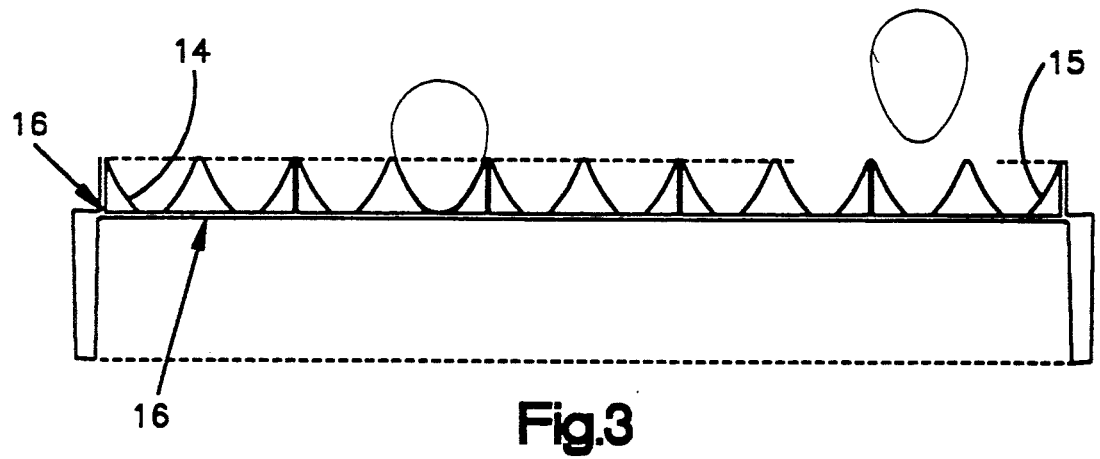
FIG. 3 is a cross sectional view a setter/hatcher tray illustrating the egg support function of the upper egg support portion of a setter/hatcher tray.
Figure 4:
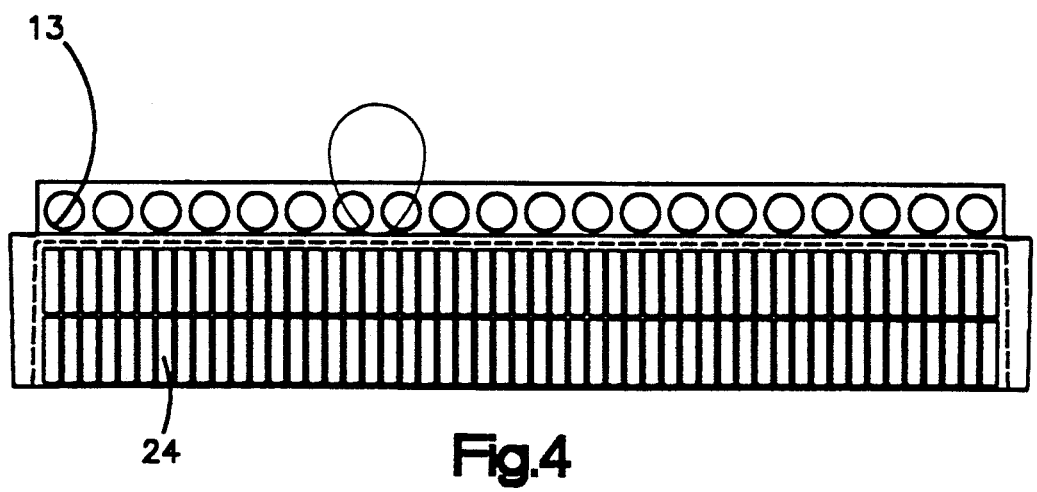
FIG. 4 is a side elevational view of a setter/hatcher tray illustrating ventilation slots and ports which promote air circulation for egg temperature regulation when the setter/hatcher trays are in stacked relationship.
Figure 5:
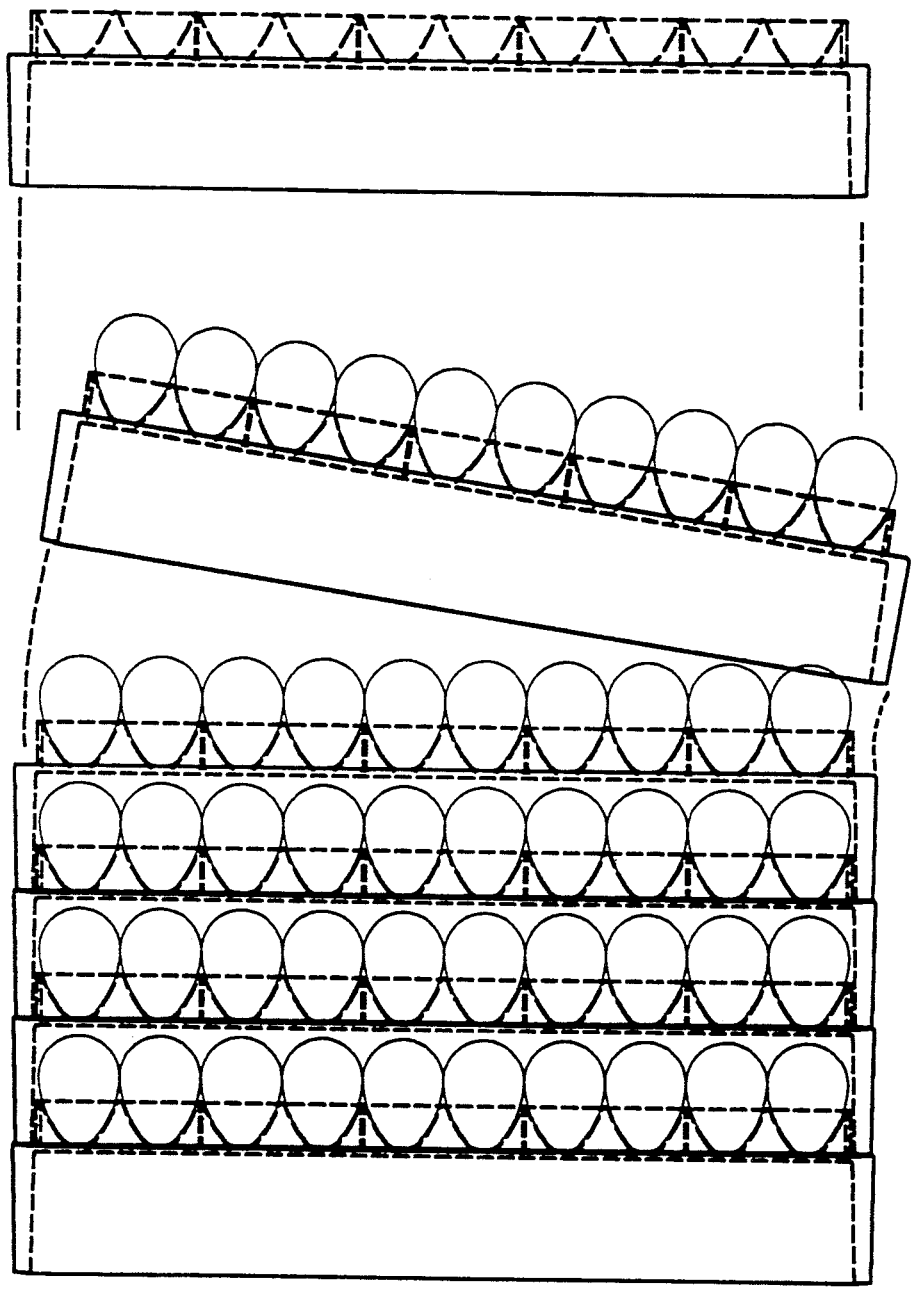
FIG. 5 is a side elevational view of a stack of the setter/hatcher trays of FIG. 3 supporting a plurality of eggs for incubation in partially nested and stacked relationship.

When a plurality of setter/hatcher trays 10 are nested, the sidewalls 24 of each hatch portion 22 substantially enclose the sides 13 of the egg support portion 12 of the next lower tray (see FIGS. 2 and 5) such that the distance between the base 16 of the next upper hatch section 26 and the top surface 11 of the egg support portion 12 of the next lower tray is less than the length of an egg of the type the tray is intended to support. When nested, the distance between the bottom of the egg support portion 12 of the next lower tray and the base 16 of the next upper hatch section 26 is just greater than the length of an egg of the type the tray is intended to support. This compact nesting relationship maximizes the use of space within the incubator to allow more eggs to be incubated at one time. Moreover, the compact nesting relationship promotes the damage-free transfer of eggs from one egg support portion 10 to a corresponding hatch section 26 since the distance an egg falls during inversion is minimized.

In use, a plurality of eggs are manually placed into the support receptacles 14 of an egg tray 10. Once a tray 10 is fully loaded with eggs, the hatch portion 22 of another tray is placed atop the tray 10 in nesting relationship. The egg support portion 12 of the other tray may then be loaded with eggs. The stacking process continues in like fashion until a stack sufficient to substantially fill a portion of an incubator volume is created. With a normally preferred procedure, a number of trays 10 are loaded with eggs prior to stacking and then placed in stacked relationship. An empty tray 10 is placed atop the stack to provide a hatch portion 22 for the top most tray. Once created, the stack is then placed into the incubator portion for incubation. This stacked relationship substantially eliminates the need for shelves within the incubator since only the lowest tray of the stack need be supported.

Figure 6:
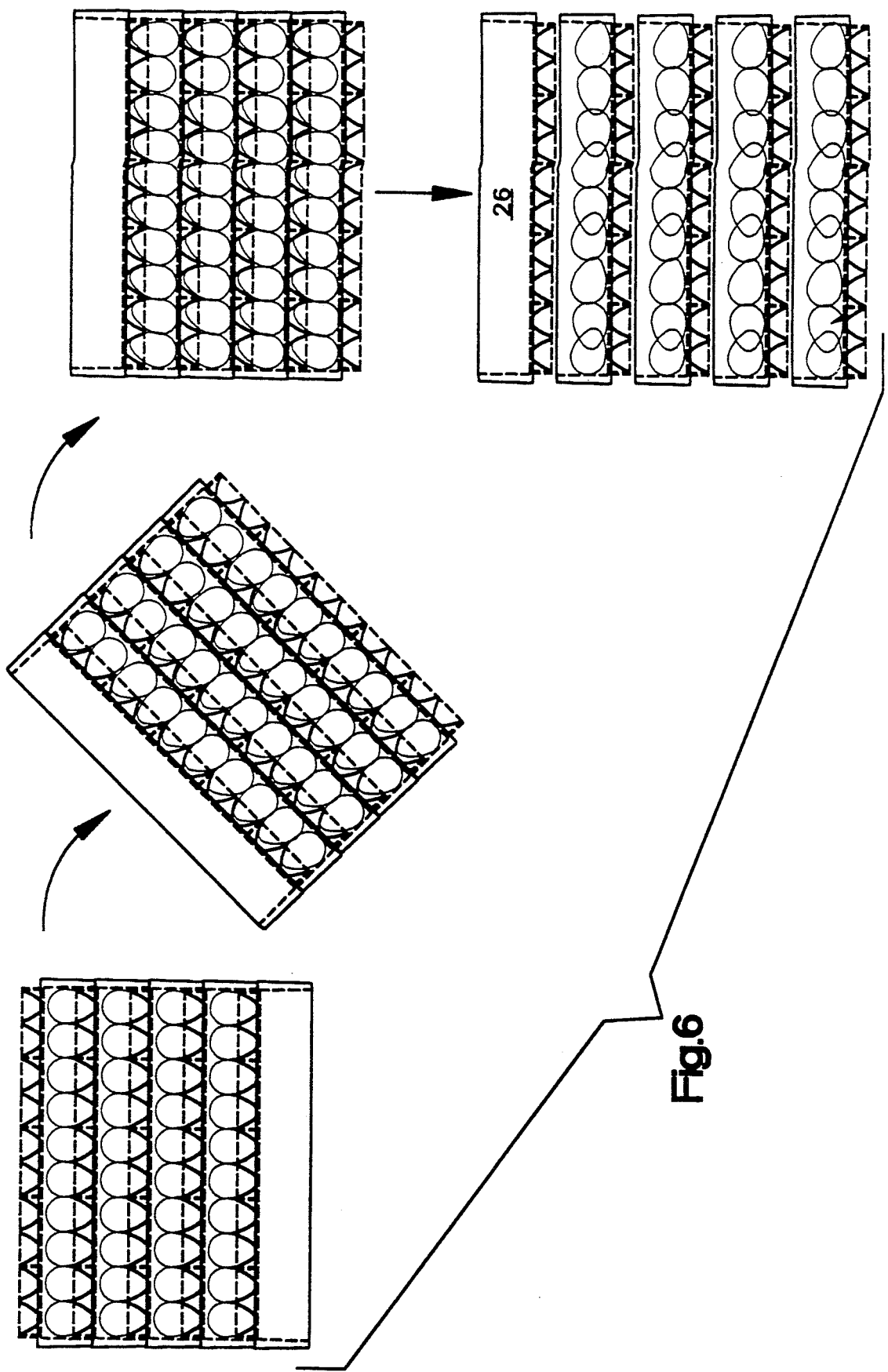
FIG. 6 is a side elevational view of the stacked setter/hatcher trays of FIG. 5 illustrating inversion of a stack to transfer eggs from the upper egg support portions to the hatch portions of the next adjacent trays.

After 13-19 days have passed, the stacked trays 10 are removed from the incubator. As illustrated in FIG. 6, each stack is then inverted to cause the support of the eggs to be transferred from the egg support portion 12 to each adjacent corresponding hatch section 26. The stack may be inverted while still positioned atop a buggy used to move stacks into the incubator, or upon removing the stack from such a buggy.

Once a stack is inverted, the eggs continue to be disposed in a substantially vertical orientation such that the wider egg end is supported by the base 16 within the hatch section 26, while the narrow egg end receives support from the egg support receptacle 14. Next, the trays 10 are un-nested allowing the eggs roll into a horizontal orientation since the egg support receptacles 14 no longer support the narrow egg ends.

The volume of the hatch section 26 provides the eggs with sufficient room for unobstructed rolling movement when a stack of trays 10 are inverted and un-nested. The unobstructed rolling movement allows the chicks to cleanly break free of their respective egg shells during the hatch. Moreover, once hatched, the chicks are not confined to a restrictive, possibly injurious space, but are free to move throughout the hatch section 26. The fully loaded egg trays 10 are unstacked and placed onto shelves in a hatch chamber or hatch buggy for hatching.

Figure 7:
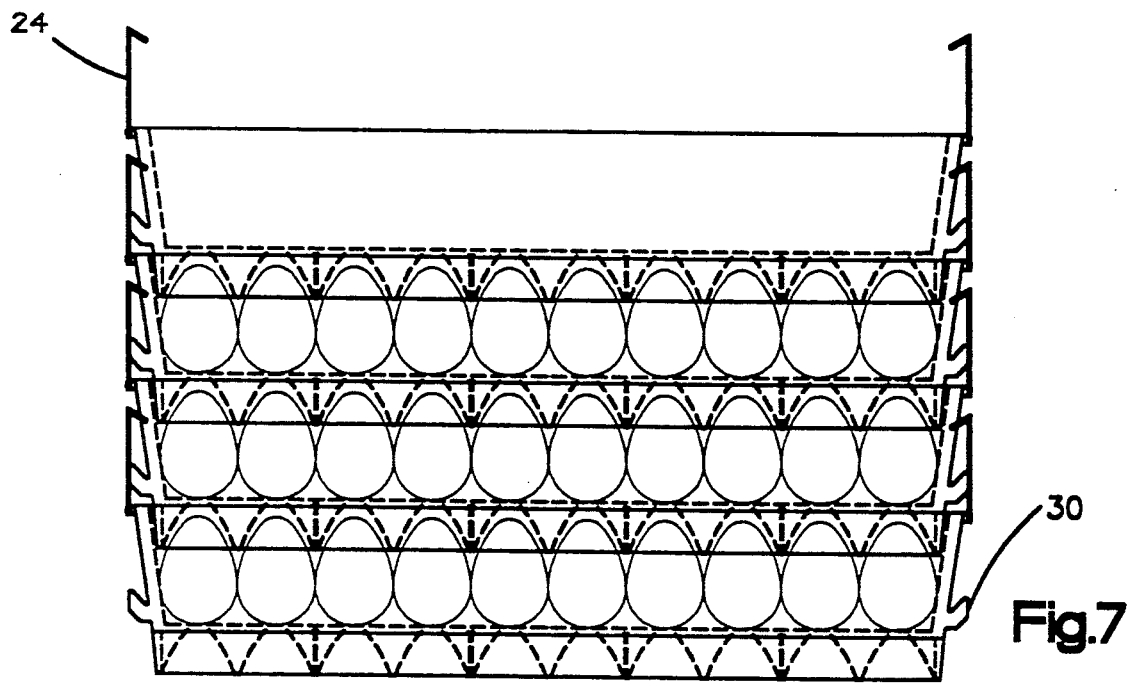
FIG. 7 is a side elevational view of an alternate embodiment of a stack of nested interconnected setter/hatcher trays.
Figure 8:
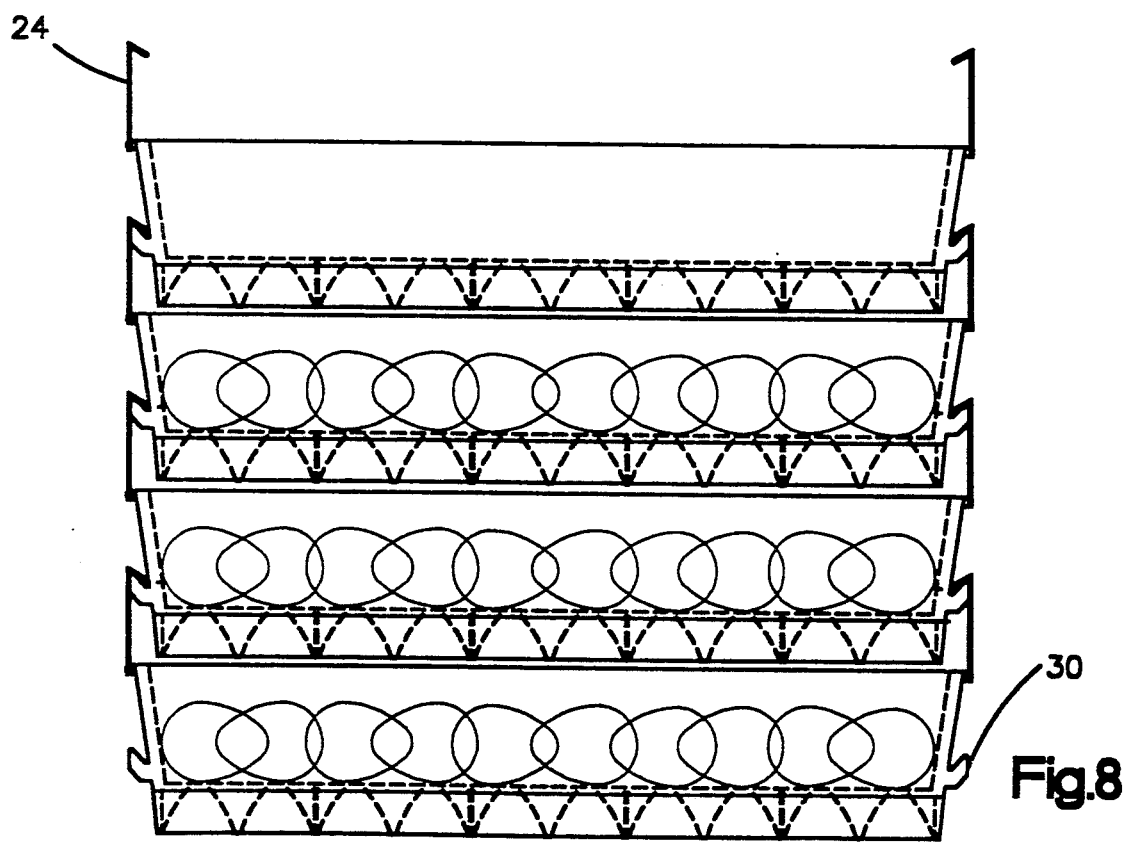

An alternative hatching embodiment which minimizes the necessity of hatch buggy shelving is illustrated in FIGS. 7 and 8. In this embodiment, eggs are placed in the upper egg support portion 12, and the trays 10 are nested as discussed above. When the 13-19 day incubation period is complete, the nested trays are removed from the incubator and inverted to transfer the major support of the eggs to the next adjacent hatch sections 26 as discussed above.

The trays are interconnectedly joined together with bracket-like lost motion clips 28. The stack is then placed into a hatch chamber. The hatch chamber may include a lift mechanism (not disclosed) which raises the top most tray to engage the lost motion clips 28 of the second most tray with the lost motion studs 30 of the top most tray. The interaction of the lost motion clips 28 and the lost motion studs 30 suspends the second tray from the top most tray in an unnested and spaced state sufficient to allow the eggs supported by the base 16 within the hatch sections 26 of each tray 10 to roll into a horizontal orientation thereby promoting the hatching and maintenance of newborn chicks in the second most tray by providing each hatched chick with ample room for movement. As the second tray is lifted, the lost motion clips 28 of the second tray engage the lost motion studs 30 of the third or next lower tray. The unnesting process continues in similar fashion until the lost motion clips 28 of each tray engage the lost motion studs 30 of their respective next lower trays. Once the hatching period is complete, the trays and chicks are removed, in the suspended state, from the hatching chamber for further processing.

While a preferred embodiment of the invention has been described with particularity, modifications or alterations maybe made therein without departing from the spirit and scope of the invention set forth in the appended claims.

What I claim is:

1. An improved nestable setter/hatcher egg tray comprising:
   a. a base portion;
   b. an upper egg support portion secured to the base portion and defining a plurality of egg receptacles, said receptacles each having egg support means to support an egg in a substantially vertical position within said receptacles;
   c. a hatch portion secured to said base portion opposite said upper egg support portion and having a hatch section defined by apertured sidewalls, said sidewalls substantially enclosing the upper egg support portion of another like tray when placed in nesting relationship with such other tray;
   d. the distance between such base portion of said other tray and a top surface of said upper egg support portion is less than the length of an egg of the type the tray is intended to support when two of such trays are in nested relationship whereby the eggs are supported in a substantially vertical orientation when the eggs are supported on the hatch portion after invertion and prior to unnesting of the trays; and
   e. said hatch section providing unobstructed rolling movement of said eggs within said hatch section when a stack of nested trays are inverted and unnested.

2. The apparatus of claim 1 further comprising interconnection means joining a plurality of said nested setter/hatcher trays in telescoping relationship and when said trays are inverted and unnested during the hatching cycle maintaining interconnection of the trays.

3. The tray of claim 1 wherein the base portion defines apertures to promote air flow between said egg support portion and said hatch portion and around and about such eggs supported in said egg support portion and said hatch portion.

4. The tray of claim 3 wherein the base portion apertures are sized such that the balance of the base portion provides a perchable surface for a newborn chick.

5. An improved method of setting and hatching poultry eggs comprising:
   a. placing at least one egg into at least one egg receptacle in an upper setter portion of a setter/hatcher tray with the receptacle supporting the egg in a substantially vertical orientation;
   b. placing a hatch section of a lower hatcher portion of another setter/hatch tray in nesting relationship with said upper setter portion, said hatch section of said lower hatcher portion having a base, and wherein the space between the base of said lower hatch section of said other setter/hatch tray and said upper setter portion is such that the eggs positioned in said egg receptacles maintain a substantially vertical orientation when a stack of said trays are inverted;
   c. repeating steps a. and b. until the volume of a stack of said nested setter/hatcher trays substantially equals the volume of a portion of an incubator;
   d. placing said stack in said incubator and retaining them there throughout the incubation cycle of said eggs;
   e. periodically tilting said stack while in the incubator;
   f. removing said stack from said incubator;
   g. inverting said stack so that the support of the eggs substantially transfers from the receptacles in said upper setter portion to the adjacent hatch section of said lower hatch portion;

h. un-nesting said inverted stack of trays to support the eggs in a substantially horizontal orientation within the hatch sections to provide adequate space for chicks once hatched;

i. placing the un-nested inverted trays in a hatcher and maintaining them in the hatcher throughout a hatch cycle; and j. removing said trays from said hatcher upon completion of said hatch cycle.

6. The method of claim 5 wherein step g. further comprises inverting said stack so that the eggs are supported by the lower hatch portion in a substantially vertical orientation.

7. An improved method of setting and hatching poultry eggs comprising:

a. placing at least one egg in an egg setter portion of a combination setter/hatcher tray;

b. nesting a lower hatch portion of another setter/hatcher tray above said setter portion so that the side walls of each lower hatch portion completely surround the eggs supported in said egg setter portion;

c. repeating steps a. and b. until the volume of a stack of said nested setter/hatcher trays substantially fills a section of an incubator;

d. placing said stack of within the incubator and retaining them there throughout an incubation cycle;

e. periodically tilting said stack;

f. removing said stack from said incubator upon completion of said incubation cycle;

g. inverting said stack so that each egg supported by one of said setter trays slidingly moves from the vertical position supported by said setter portion to a substantially vertical position supported by the next lower hatch portion;

h. unnesting said inverted stack of trays and concurrently allowing each egg to roll into a substantially horizontal orientation within its next lower hatch portion;

i. placing said inverted stack of trays in unnested relationship in a hatch volume throughout a hatch period; and j. removing said trays from said hatch volume upon completion of said hatch period.

8. The method of claim 7 wherein step i. further comprises suspending said trays in an unnested interconnected relationship in a hatcher.

9. A combination incubation and hatch tray for use during both incubation and hatch portions of a hatching cycle comprising:

a. a rectangular base, the base including egg support structure along one surface for supporting eggs in upright position in a tray incubation section during transport and the incubation portion of a cycle;

b. the base including an opposed surface for supporting eggs and chicks in a hatching section during the hatch portion of the cycle;

c. a perimetrical wall structure connected to the base and surrounding and delineating the perimeter of the hatch section;

d. the incubation section including surfaces adapted to coact with the wall structure of a like tray whereby to laterally locate such trays relatively in a nesting relationship of minimized volume for housing of the eggs during incubation;

e. a stack of said trays being invertible as a unit for transferring the support of eggs from each incubation section to each hatching section of an adjacent tray;

f. the trays being positioned in a non-nested relationship during the hatch portion of a cycle.

10. The tray of claim 9 wherein the base defines apertures to promote air flow between said egg support structure and said hatching section.

11. The tray of claim 9 wherein the base includes a perchable surface for a newborn chick.

12. The tray of claim 9 wherein the eggs are supported in a substantially vertical orientation in each hatching section of an inverted, nested stack of trays.

13. The tray of claim 9 wherein the eggs are supported in a substantially horizontal orientation in each hatching section of an inverted, unnested stack of trays.

* * * * *